(12) United States Patent
Kendall et al.

(10) Patent No.: US 8,666,079 B2
(45) Date of Patent: Mar. 4, 2014

(54) DECODING AND ENCODING DATA (75) Inventors: Chad William Kendall, Burnaby (CA); Narendra Sankar, Campbell, CA (US)

(73) Assignee: Broadcom Corporation, Irvine, CA (US)

( * ) Notice: Subject to any disclaimer, the term of this patent is extended or adjusted under 35 U.S.C. 154(b) by 1101 days.

(21) Appl. No.: 12/129,348

(22) Filed: May 29, 2008

(65) Prior Publication Data
US 2009/0296935 A1 Dec. 3, 2009

(51) Int. Cl.
*H04L 9/00* (2006.01)
*H04N 7/167* (2011.01)
*H04K 1/00* (2006.01)

(52) U.S. Cl.
USPC ............. 380/277; 380/44; 380/45; 380/200; 380/201; 380/210; 380/217; 380/255; 380/269

(58) Field of Classification Search
USPC ............. 380/277, 44, 45, 255, 269, 200, 201, 380/210, 217
See application file for complete search history.

(56) References Cited

U.S. PATENT DOCUMENTS

| | | | | |
|---|---|---|---|---|
| 5,166,976 A * | 11/1992 | Thompson et al. | ........... | 380/225 |
| 5,185,794 A * | 2/1993 | Thompson et al. | ........... | 380/235 |
| 5,267,312 A * | 11/1993 | Thompson et al. | ........... | 380/237 |
| 5,406,627 A * | 4/1995 | Thompson et al. | ........... | 380/237 |
| 5,936,559 A * | 8/1999 | Howard | ........... | 341/81 |
| 6,351,538 B1 * | 2/2002 | Uz | ........... | 380/201 |
| 6,353,672 B1 * | 3/2002 | Rhoads | ........... | 382/100 |
| 6,909,753 B2 * | 6/2005 | Meehan et al. | ........... | 375/240.27 |
| 7,400,725 B1 * | 7/2008 | Yumiba et al. | ........... | 380/201 |
| 7,725,715 B2 * | 5/2010 | Veiseh et al. | ........... | 713/168 |
| 2002/0006204 A1 * | 1/2002 | England et al. | ........... | 380/269 |
| 2002/0094081 A1 * | 7/2002 | Medvinsky | ........... | 380/44 |
| 2002/0168066 A1 * | 11/2002 | Li | ........... | 380/200 |
| 2003/0206636 A1 * | 11/2003 | Ducharme et al. | ........... | 380/277 |
| 2004/0037422 A1 * | 2/2004 | Bodo et al. | ........... | 380/210 |
| 2004/0081333 A1 * | 4/2004 | Grab et al. | ........... | 382/100 |
| 2005/0254788 A1 * | 11/2005 | Yamagata et al. | ........... | 386/94 |
| 2007/0098000 A1 * | 5/2007 | Wajs et al. | ........... | 370/412 |
| 2009/0132825 A1 * | 5/2009 | Mohanty | ........... | 713/176 |
| 2009/0161760 A1 * | 6/2009 | Gordon et al. | ........... | 375/240.16 |
| 2009/0168892 A1 * | 7/2009 | McFarland et al. | ........... | 375/240.24 |

* cited by examiner

*Primary Examiner* — Teshome Hailu
(74) *Attorney, Agent, or Firm* — McDermott Will & Emery LLP (57) ABSTRACT

A method includes receiving data which has been encoded according to a first higher complexity protection scheme and compressed. The method also includes decompressing the data. The method also includes decoding the data according to the first higher complexity protection scheme using a first higher complexity key. The method also includes encoding at least the first portion of the data according to a second higher complexity protection scheme using a second higher complexity key. The method also includes encoding at least a second portion of the data according to a lower complexity protection scheme using a lower complexity key.

10 Claims, 5 Drawing Sheets

DECODING AND ENCODING DATA

TECHNICAL FIELD

This description relates to data protection.

BACKGROUND

Data may be encrypted to prevent unauthorized copying. However, processing encrypted data may consume a large amount of computer resources.

SUMMARY

The details of one or more implementations are set forth in the accompanying drawings and the description below. Other features will be apparent from the description and drawings, and from the claims.

DETAILED DESCRIPTION

Figure 1:
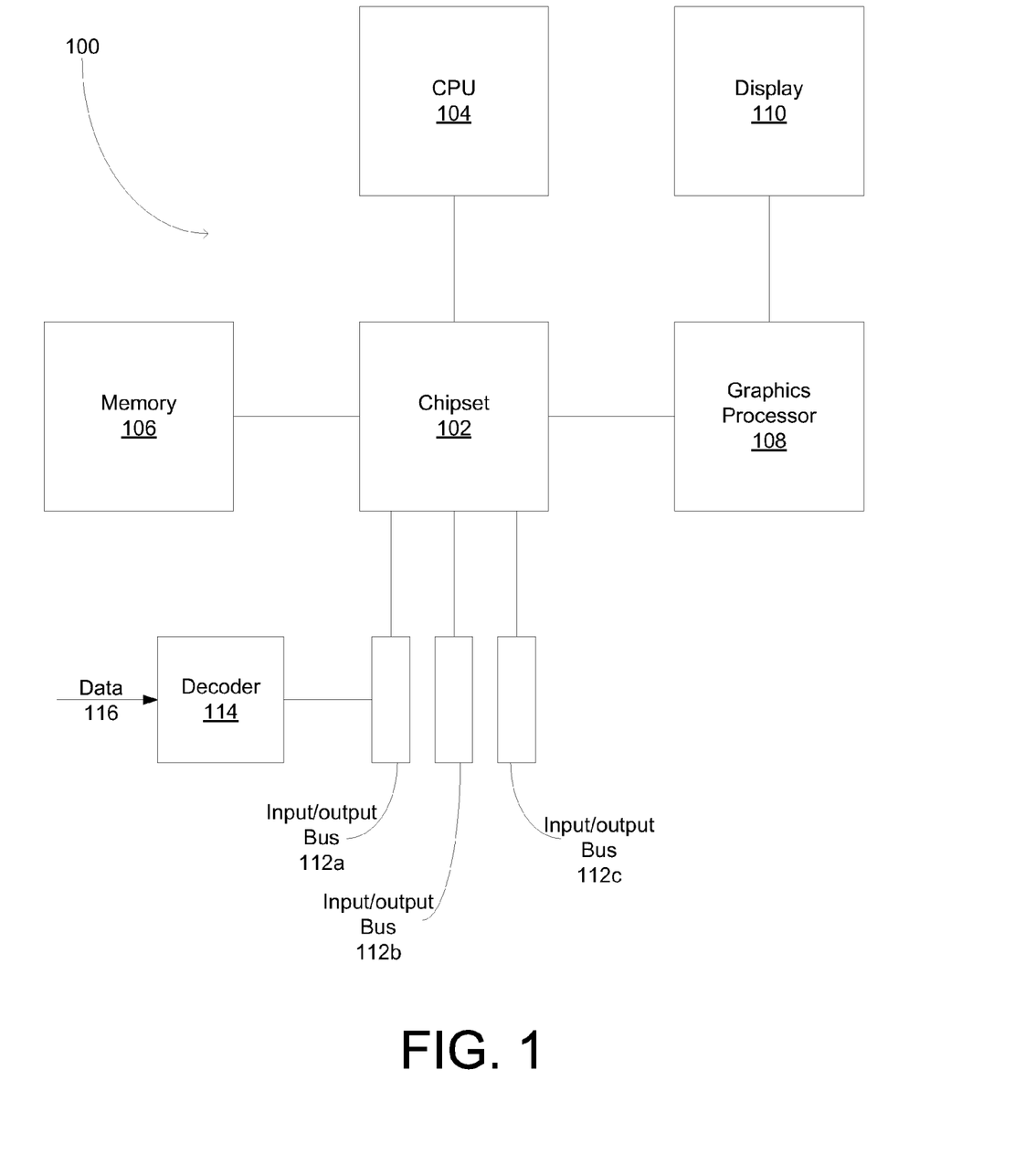
FIG. 1 is a block diagram of a computer system according to an example embodiment.

FIG. 1 is a block diagram of a computer system 100 according to an example embodiment. In this example, the computer system 100 may include a chipset 102, a central processing unit (CPU) 104, a memory 106, a graphics processor 108, a display 110, and a plurality of input/output busses 112a, 112b, 112c. In an example embodiment, the chipset 102 may include a plurality of chips, or integrated circuits, configured to link devices in the computer system 100 together. The chipset 102 may, for example, link the CPU 104, the memory 106, the graphics processor 108, and/or any devices connected to any or all of the input/output busses 112a, 112b, 112c.

The CPU 104 may execute stored instructions such as computer programs. The programs, which may include software applications or software programs, may, for example, be stored on the memory 106. The memory 106 may include volatile and/or non-volatile memory, such as random access memory (RAM) including dynamic random access memory (DRAM), read only memory (ROM) such as semiconductor memory devices including, erasable programmable read-only memory (EPROM), electrically erasable programmable read-only memory (EEPROM), and flash memory devices; magnetic disks, such as internal hard disks or removable disks; magneto-optical disks; and CD-ROM and DVD-ROM disks. These are merely examples, and the disclosure is not limited thereto.

The graphics processor 108 may process data, such as graphics data, and send the data to the display 110. The graphics processor 108 may, for example, process data received from one or more of the input/output busses 112a, 112b, 112c or from the CPU 104. The graphics processor 108 will be described in further detail below.

The display 110 may display graphics. The display 110 may display graphics based, for example, on data received from the graphics processor 108. The display 110 may include a monitor, such as a cathode ray tube, liquid crystal display, plasma display, or surface-conduction electron-emitter display, according to various example embodiments.

The input/output busses 112a, 112b, 112c may serve as interfaces between the computing system 100 and external devices. The input/output busses 112a, 112b, 112c may be coupled to external devices which communicate with the computing system 100, such as via the chipset 102. The input/output busses 112a, 112b, 112c may, for example, include peripheral component interconnect (PCI) or PCI Express busses, according to example embodiments.

For example, the input/output bus 112a may be coupled to a decoder 114. The decoder 114 may decode received data 116 for processing by the graphics processor 108. The decoder 114 may receive data from, for example, a compact disc (CD), digital versatile disc (DVD), Blu-ray disk, or high density disk (HDD). The received data 116 may be video data, and may be received in the form of frames, such as raster frames, according to example embodiment. In other example embodiments, the received data 116 may be audio data, or multimedia data. These are merely examples, and this disclosure is not limited thereto.

Figure 2:
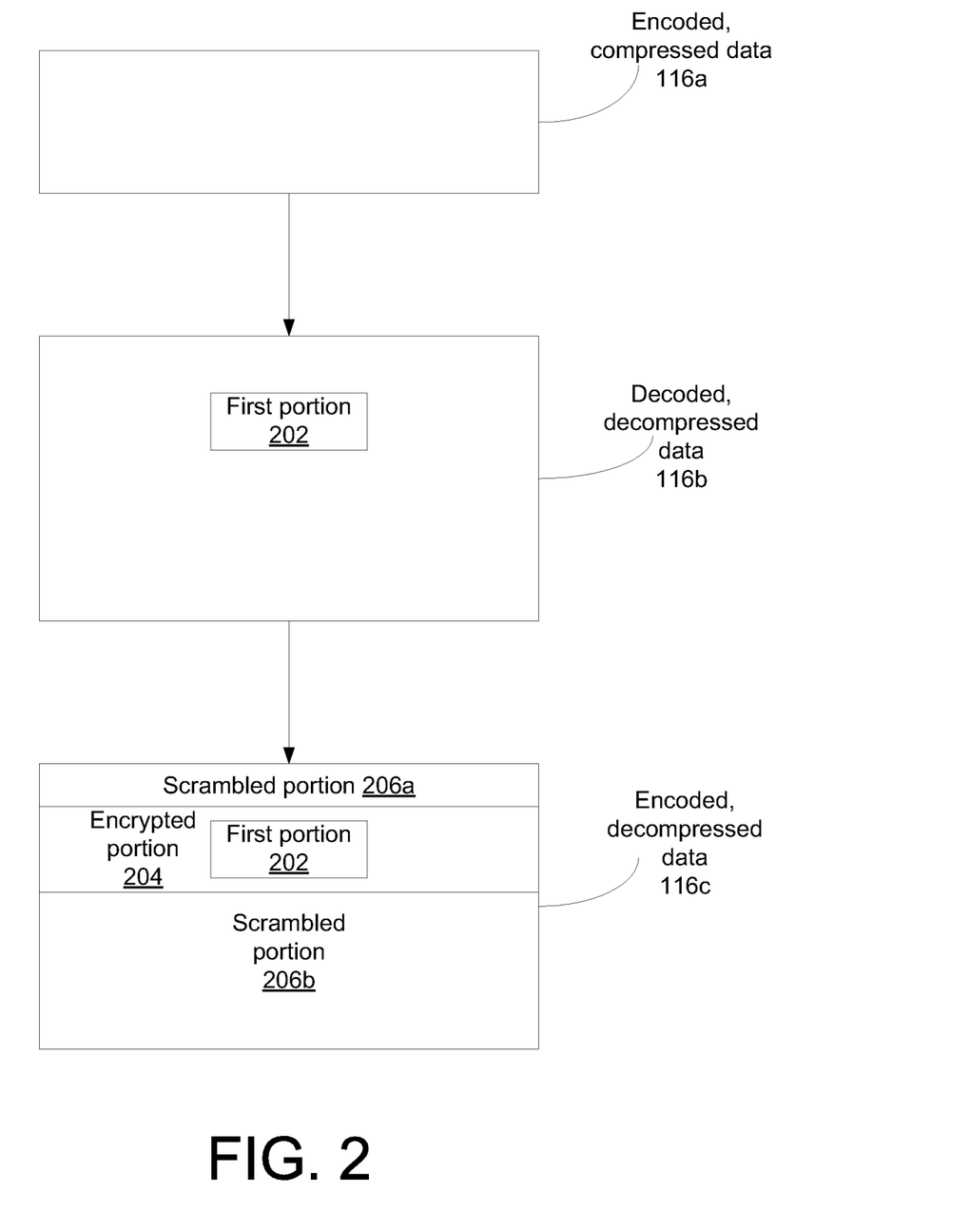
FIG. 2 is a block diagram showing data at various stages according to an example embodiment.

FIG. 2 is a block diagram showing data 116 at various stages according to an example embodiment. The data 116a may be received by the decoder 114 (shown in FIG. 1). The received data 116a may be in the form of a frame, such as a raster frame, and may correspond to a single picture on the display 110. The decoder 114 may successively receive frames of data 116a, such as sixty times per second, according to an example embodiment.

The received data 116a may have been compressed. The received data 116a have been compressed according to any of a variety of compression techniques to reduce the size of the data. The received data 116a may also have been encoded according to a first higher complexity protection scheme using a first higher complexity key, such as a first encryption scheme using a first encryption key. The first higher complexity key may be the same for all frames of data coming from a single source (such as a CD, DVD, Blue-ray disc, or HDD), or may change for different groups or frames of data. The first higher complexity key may have been previously known by the decoder 114 and/or computing system 100, and may have been stored in software or memory 106. The received data 116a may, for example, have been encrypted according to an Advanced Encryption Standard (AES), using a 128-bit, 192-bit, or 256-bit key.

The decoder 114 may decode the received data 116a according to the first higher complexity protection scheme using the first higher complexity key. The first higher complexity protection scheme and first higher complexity key may have been previously known to the decoder 114. The decoder 114 may, for example, decrypt the received data 116a using the first encryption key, such as a 128-bit, 192-bit, or 256-bit AES encryption key. The decoder 114 may decompress the received data 116a. The decoder 114 may decompress the received data 116a, increasing the size of the data to a size appropriate for sending to the CPU 104, graphics processor 108, and/or display 110. According to an example embodiment, the decoder 114 may successively receive encoded and compressed data, and may successively decode and decompress the data 116a, such as by successively decoding and decompressing frames of received data 116a.

By decoding and decompressing the received data packet 116a, the decoder 114 may generate decoded, decompressed data 116b. The decoded, decompressed data 116b may be in the form of a frame, such as a raster frame. If the decoded, decompressed data 116b were sent to the graphics processor 108 and/or display 110 via the chipset 102, the decoded, decompressed data 116b may be accessible to devices coupled to any of the input/output busses 112b, 112c, according to an example embodiment. To protect the data 116 from access by external devices, the decoder 114 may encode the decoded, decompressed data 116, according to an example embodiment. In the example shown in FIG. 2, the decoder 114 may generate a lower complexity key based on a first portion 202 of the data 116. The decoder 114 may, for example, generate inputs for a lower complexity protection scheme algorithm based on the first portion 202 of the data 116. The decoder 114 may generate the lower complexity key based on the first portion 202 of the decoded, decompressed data 116b. The decoder 114 may, for example, generate a scrambling key based on the first portion 202 of the decoded, decompressed data 116b. The scrambling key may include inputs to a scrambling algorithm generated based on bits included in the first portion 202 of the decoded, decompressed data 116b, according to an example embodiment. In another example embodiment, the lower complexity key or scrambling key may have been previously known to the decoder 114.

The decoder 114 may encode at least the first portion 202 of the data 116 according to a second high complexity protection scheme using a second higher complexity key. The second high complexity protection scheme may be substantially similar to, or even identical to, the first high complexity protection scheme, using a different higher complexity key. Or, the second high complexity protection scheme may be substantially different from the first high complexity protection scheme. The decoder 114 may, for example, encode the first portion 202 of the decoded, decompressed data 116, which includes the data may have been used to generate the lower complexity key. The first portion 202 of the data 116b, which may have been used to generate the lower complexity key, may thereby be made inaccessible without first decoding the data 116 according to the second higher complexity protection scheme using the second higher complexity key.

The decoder 114 may, for example, encrypt at least the first portion 202 of the data 116b, and may encrypt other portions of the data 116b, thereby generating an encrypted portion 204 of the data 116. The encrypted portion 204 may include the first portion 202, the first portion 202 having been used to generate the lower complexity protection or scrambling key, according to an example embodiment.

The decoder 114 may also encode at least a second portion of the data 116b according to a lower complexity protection scheme using the lower complexity key which was generated based on the first portion 202 of the data 116b, or using a lower complexity key which was previously known to the decoder 114. The decoder 114 may, for example, encode according to the lower complexity protection scheme any or all of the decoded, decompressed data 116b which was not encoded according to the second higher complexity protection scheme.

The decoder 114 may, for example, scramble the second portion of the data 116b using the scrambling key that was either previously known or generated based on the first portion 202 of the data 116b. The decoder 114 may scramble, using the scrambling key generated based on the first portion 202 of the data 116b, any or all of the data 116b which was not encrypted. In an example embodiment, the decoder 114 may generate, based on the decoded, decompressed data 116b, encoded decompressed data 116c. The encoded decompressed data 116c may be in the form of a data frame, such as a raster frame. The encoded decompressed data 116 may, for example, include an encrypted portion 204, which may include the first portion 202 used to generate the scrambling key, and one or more scrambled portions 206a, 206b. In the example shown in FIG. 2, a first scrambled portion 206a precedes the encrypted portion 204, and a second scrambled portion 206b succeeds the encrypted portion 204. However, the encrypted portion 204 may be included in any part of the encoded, decompressed data 116c, according to an example embodiment. In an example embodiment, the encoded, compressed data 116a may flow into the decoder 114 at a lower data rate, such as 40 Mbps, and the encoded, decompressed data 116c may flow out of the decoder 114 at a higher data rate, such as 100 Mbps.

In an example embodiment, the decoder 114 may send the encoded, scrambled data 116 to the CPU 104 (shown in FIG. 1), such as via the input/output bus 112a (shown in FIG. 1) and/or chipset 102 (shown in FIG. 1). The CPU 104 may decode at least the first portion 202 of the data 106 according to the second higher complexity protection scheme using the second higher complexity key. The second higher complexity key may have been previously known to the CPU 104, such as by storage in the memory 106. The CPU 104 may, for example, decrypt the encrypted portion 204 of the encoded data 116c, which may be included the first portion used to generate the lower complexity key or scrambling key, using the second encryption key. After decrypting the encrypted portion 204, the CPU 104 may generate the lower complexity key or scrambling key based on the first portion 202 of the data 116, or the lower complexity key or scrambling key may be previously known to the CPU 104. The CPU 104 may decode a second portion of the data 116, which may include a remaining portion of the data 116, according to the lower complexity protection scheme using the lower complexity key. For example, the CPU 104 may descramble the remaining portion of the data 116 using the descrambling key generated based on the first portion 202 of the data 116 which was included in the encrypted portion 204 of the data 116 (which was decrypted using the decryption key). The CPU 104 may thereafter send the decoded data to the graphics processor 108, which may send the decoded data to the display 110, according to an example embodiment.

Figure 3:
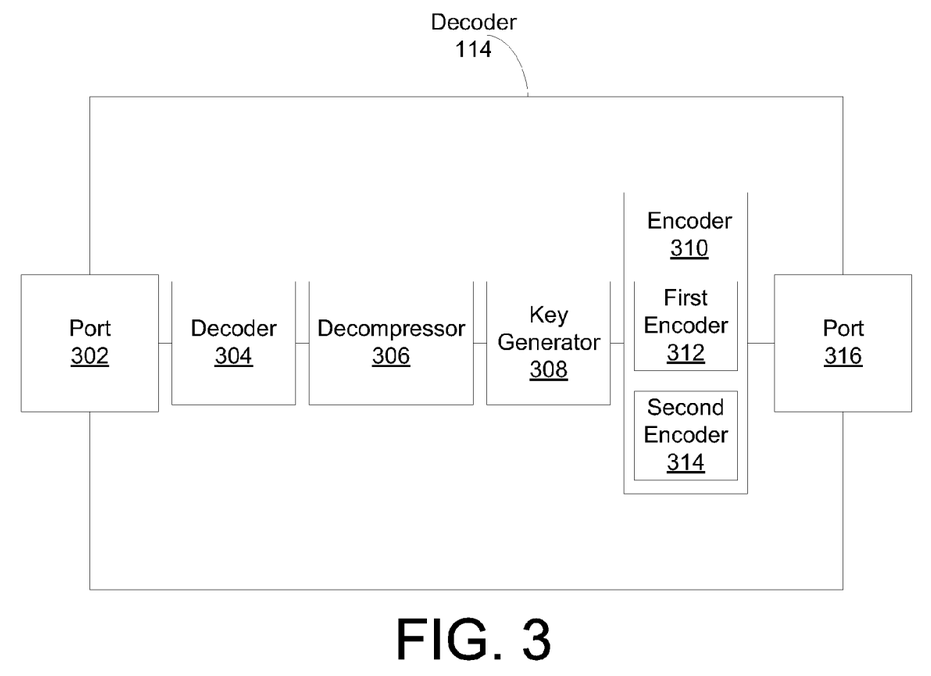
FIG. 3 is a block diagram of a decoder according to an example embodiment.

FIG. 3 is a block diagram of the decoder 114 according to an example embodiment. In this example, the decoder 114 may include a port 302. The port 302 may receive the encoded, compressed data 116a, such as from a CD, DVD, Blu-ray disc, or HDD. The port 302 may send the encoded, compressed data 116a to a decoder 304 included in the decoder 114. The decoder 304 may decode the data 116 according to the first higher complexity protection scheme using the first higher complexity key, and send the data 116 to the decompressor 304.

The decoder 114 may include a key generator 308. The key generator 308 may generate a lower complexity key, such as a scrambling key, based on the first portion 202 of the data 116. The key generator 308 may receive the data 116, generate the lower complexity key, and send the data 116 to an encoder 310. Or, the decompressor 304 may send the data 116 to the encoder 310, and the key generator 308 may generate the lower complexity key by accessing the first portion 202 of the data 116 within the decompressor 304 or the decoder 306, according to various example embodiments.

The encoder 310 may receive the data 116. The encoder 310 may encode a first portion of the data 116 according to the second higher complexity protection scheme using the second higher complexity key. For example, the encoder 310 may encrypt the first portion of the data 116 using the second encryption key to generate the encrypted portion 206. The encoder 310 may also encode a second portion of the data 116 using the lower complexity key which may have been previously known or generated by the key generator 308. For example, the encoder 310 may scramble the second portion of the data 116 using the scrambling key generated by the key generator 308 to generate the scrambled portions 206a, 206b, according to an example embodiment. The encoder 310 may send the encoded, decompressed data 116c to a port 316. The port 316 may send the encoded, decompressed data 116c to the CPU 104, such as via the chipset 102 and/or input/output bus 112a, according to an example embodiment.

In an example embodiment, the encoder 310 may include a first encoder 312 and a second encoder 314. The first encoder 312 may encode the first portion of the data 116 according to the second higher complexity protection scheme using the second higher complexity key, such as by encrypting the first portion of the data 116 using the second encryption key to generate the encrypted portion 204. The second encoder 314 may encode the second portion of the data 116 according to the lower complexity protection scheme using the lower complexity key generated by the key generator 308, such as by scrambling the second portion of the data 116 using the scrambling key generated by the key generator 308 to generate the scrambled portion(s) 206a, 206b.

Figure 4:
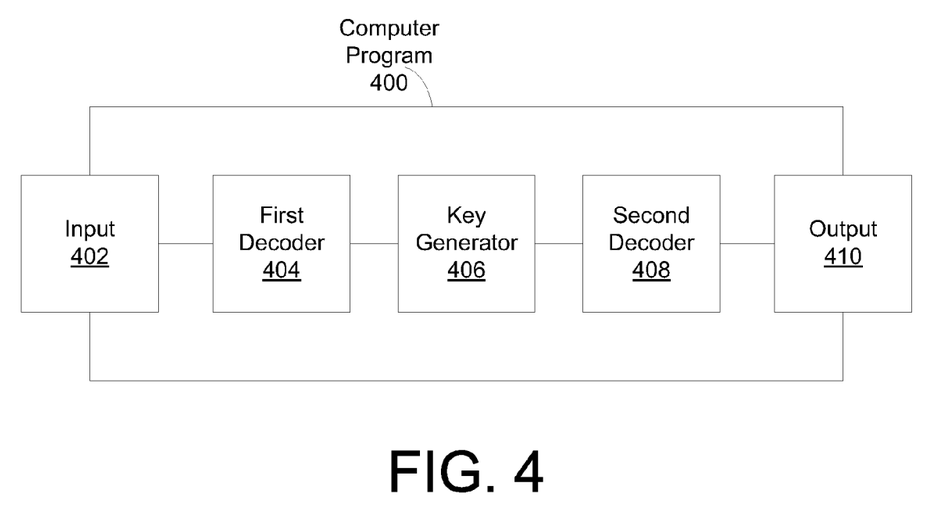
FIG. 4 is an object diagram of a computer program according to an example embodiment.

FIG. 4 is an object diagram of a computer program 400 according to an example embodiment. The computer program 400 may, for example, be stored in memory 406 and include instructions for execution by the CPU 104. The computer program 400 may also be tangibly embodied on a computer-readable medium and copied or transferred onto the memory 406. The computer program 400 may include an input 402 configured to receive data. The input 402 may, for example, receive the encoded data 116c generated and/or sent by the decoder 114. The input 402 may send the data to a first decoder 404. The first decoder 404 may decode a first portion of the data according to a higher complexity scheme using a higher complexity key (such as the second higher complexity scheme using the second higher complexity key). The first decoder 404 may decode the first portion 202 of the data 116 which was used to generate the higher complexity key. The first decoder 404 may decrypt the first portion 202 of the data 116 using a decryption key. The first decoder 404 may, for example, decrypt the encrypted portion 204, which includes the first portion 202, of the encoded data 116c.

The computer program 400 may also include a key generator 406. The key generator 406 may generate a lower complexity key based on the decoded first portion of the data. The key generator 406 may, for example, generate a scrambling key based on the first portion 202, which may be included in the encrypted portion 204 of the encoded data 116c, which was decrypted by the first decoder 404. The key generator 406 may generate the key by receiving the data from the first decoder and sending the data to a second decoder 408, or the key generator 406 may access the data from within the first decoder 404 and/or second decoder 408 and generate the key, according to example embodiments. In another example embodiment, the lower complexity key or scrambling key may have been previously known to the CPU 104, such as by storage in the memory 106.

The computer program 400 may also include the second decoder 408. The second decoder 408 may receive the data from the first decoder 404 or the key generator 406, according to example embodiments. The second decoder 408 may decode a second portion of the data according to a lower complexity protection scheme using the generated or previously known lower complexity key. The second decoder 408 may, for example, decode the scrambled portions 206a, 206b of the data 116 using the descrambling key. The second decoder 408 may send the decrypted and descrambled data to an output 410. The output 410 may send the data to an external device, such as a graphics processor 108, according to an example embodiment.

Figure 5:
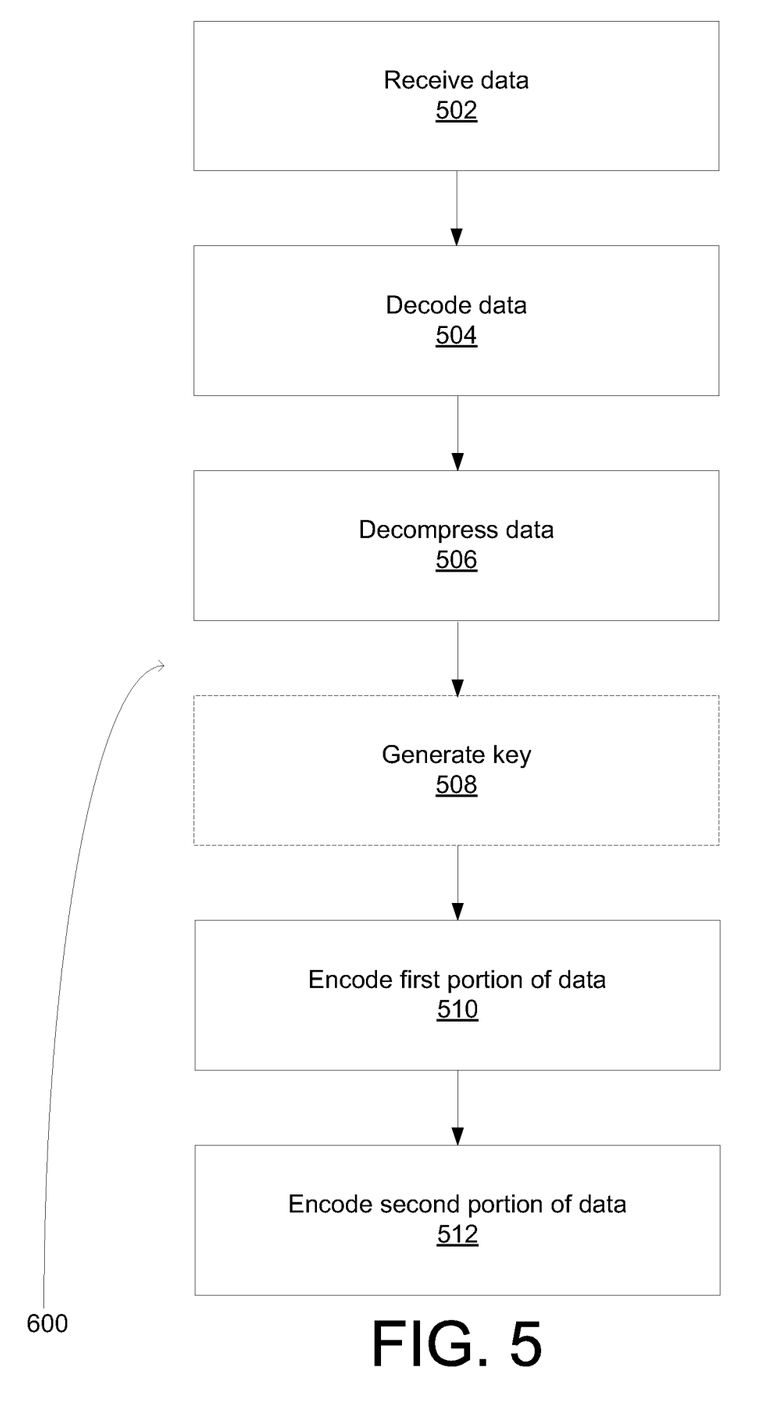
FIG. 5 is a flowchart showing a method according to an example embodiment.

FIG. 5 is a flowchart showing a method 500 according to an example embodiment. In this example, the method 500 may include the decoder 114 receiving data (502). The data may, for example, have been encoded according to a first higher complexity scheme. The data may also have been compressed.

The method 500 may also include the decoder 114 decompressing the data (504). The method 500 may also include the decoder 114 decoding the data (506). The data may be decoded according to the first higher complexity scheme using a first higher complexity key. The method 500 may also include the decoder 114 generating a key (508). The key may, for example, include a lower complexity key generated based on a first portion of the data. In another example embodiment, the lower complexity key may be previously known to the decoder 114.

The method 500 may also include the decoder 114 encoding a first portion of the data (510). The first portion of the data may, for example, be encoded according to a second higher complexity protection scheme using a second higher complexity key. The second higher complexity protection scheme may be substantially similar to, identical to, or substantially different from, the first higher complexity protection scheme, according to example embodiments.

The method 500 may also include the decoder 114 encoding a second portion of the data (512). The second portion of the data may, for example, be encoded according to a lower complexity protection scheme using the lower complexity key.

In an example embodiment, the receiving the data may include receiving the data which has been encrypted and compressed. In this example, the decoding the data may include decrypting the data using a first encryption key. The encoding at least the first portion of the data may include encrypting at least the first portion of the data using a second encryption key.

In an example embodiment, the generating the lower complexity key may include generating the lower complexity key based on the first portion of the data after the first portion of the data has been decoded according to the first higher complexity scheme using the first higher complexity key and decompressed.

In an example embodiment, generating the lower complexity key may include generating a scrambling key based on the first portion of the data. In this example, encoding at least the second portion of the data may include scrambling the second portion of data using the scrambling key.

In an example embodiment, the encoding at least the second portion of the data may include encoding all of the data, except the at least the first portion of the data encoded according to the second higher complexity protection scheme, according to the lower complexity protection scheme using the lower complexity key.

In an example embodiment, the receiving the data may include receiving video data which has been encoded according to the first higher complexity protection scheme and compressed. In this example, the decoding may include decoding the video data according to the first higher complexity protection scheme using the first higher complexity key. The decompressing may include decompressing the video data. The generating may include generating the lower complexity key based on a first portion of the video data. The encoding at least the first portion of the data may include encoding at least the first portion of the video data according to the second higher complexity protection scheme using the second higher complexity key. The encoding at least the second portion of the data may include encoding at least a second portion of the video data according to the lower complexity protection scheme using the lower complexity key.

In an example embodiment, the receiving may include successively receiving data frames which have been encoded according to the first higher complexity protection scheme and compressed. In this example, the decoding the data may include successively decoding each data frame according to the first higher complexity protection scheme using the first higher complexity key. The decompressing may include successively decompressing each data frame. The generating may include successively generating a lower complexity key for each data frame based on a first portion of the data frame. The encoding at least the first portion of the data may include successively encoding at least a first portion of each data frame according to the second higher complexity protection scheme using the second higher complexity key. The encoding at least the second portion of data may include successively encoding at least a second portion of the data according to a lower complexity protection scheme using the lower complexity key generated for the respective data frame.

Figure 6:
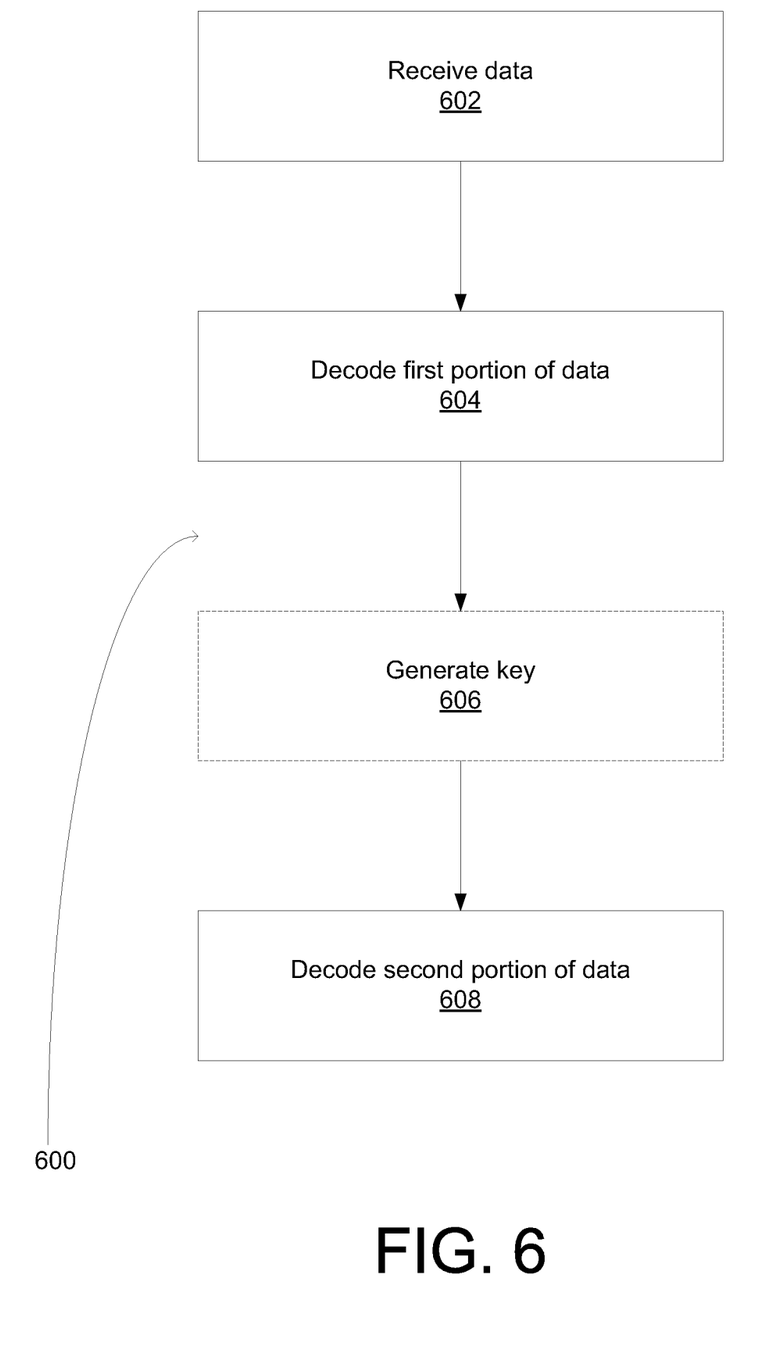
FIG. 6 is a flowchart showing a method according to an example embodiment.

FIG. 6 is a flowchart showing a method 600 according to an example embodiment. The method 600 may be performed by the CPU 104 running the computer program 400 stored in the memory 400, according to an example embodiment. In this example, the method 600 may include the CPU 104 receiving data (602). The CPU 104 may, for example, receive encoded data 116 from the decoder 114. The method 600 may also include the CPU 104 decoding a first portion of the data (604). The CPU 104 may, for example, decrypt at least the first portion 202 and/or the encrypted portion 204 of the data 116 using the decryption key. The method 600 may also include the CPU 104 generating a key (606). The CPU 104 may, for example, generate a lower complexity key, such as a scrambling key, based on data included in the first portion 202 and/or decrypted portion 204 of the data 116. In another example embodiment, the lower complexity key or scrambling key may be previously known to the CPU 104, such as by storage in memory 106. The method 600 may also include the CPU 104 decoding a second portion of the data (608). The CPU 104 may, for example, decode the scrambled portion(s) 206a, 206b of the data 116, such as by using the lower complexity key or scrambling key generated based on the first portion 202 of the data. The CPU 104 may also send the decoded data to an external device, such as a graphics processor 108.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. A method comprising:
receiving data which has been encrypted and compressed;
decrypting, by a processor, the data using a decryption key;
decompressing, by a processor, the data;
generating, by a processor, a scrambling key based on a first portion of the data after the first portion of the data has been decrypted according to a decryption scheme using the decryption key and decompressed;
encrypting, by a processor, the first portion of the data using an encryption key; and
scrambling, by a processor, a second portion of the data different from the first portion of the data using the scrambling key, the scrambling having a lower complexity than the encrypting.

2. The method of claim 1, wherein the scrambling the second portion of the data includes scrambling all of the data, except the first portion of the data which is encrypted, using the scrambling.

3. An apparatus comprising:
at least one processor; and
at least one memory device coupled to the at least one processor, the at least one memory device comprising instructions stored thereon that, when executed by the at least one processor, are configured to cause the apparatus to:
receive data which has been encrypted and compressed;
decrypt the data using a decryption key;
decompress the data;
generate a scrambling key based on a first portion of the data after the first portion of the data has been decrypted according to a decryption scheme using the decryption key and decompressed;
encrypt the first portion of the data using an encryption key; and
scramble a second portion of the data different from the first portion of the data using the scrambling key, the scrambling having a lower complexity than the encrypting.

4. The apparatus of claim 3, wherein the scrambling includes scrambling all of the data, except the first portion of the which is encrypted, using the scrambling key.

5. The apparatus of claim 3 wherein:
the data includes video data which has been encrypted and compressed;
the decrypting includes decrypting the video data scheme using the decryption key;
the decompressing includes decompressing the video data;
the generating includes generating the scrambling key based on a first portion of the video data;
the encrypting the first portion includes encrypting at least the first portion of the video data using the encryption key; and
the scrambling the second portion includes scrambling at least a second portion of the video data using the scrambling key.

6. The apparatus of claim 3 wherein:
the receiving includes successively receiving data frames which have been encrypted and compressed;
the decrypting includes successively decrypting each data frame using the decryption key;
the decompressing includes successively decompressing each data frame;
the generating includes generating a scrambling key for each data frame based on a first portion of the data frame;
the encrypting the first portion includes successively encrypting at least a first portion of each data frame using encryption key; and
the scrambling the second portion includes successively scrambling at least a second portion of the data using the scrambling key generated for the respective data frame.

7. A non-transitory computer-readable storage medium including executable code that, when executed, is configured to cause a computing device to:
receive data;
decrypt a first portion of the data using a decryption key;
decompress the first portion of the data;
generate a scrambling key based on the decrypted first portion of the data after the first portion of the data has been decrypted according to a decryption scheme using the decryption key and decompressed; and
descramble a second portion of the data different from the first portion of the data using the scrambling key, the descrambling having a lower complexity than the decrypting.

8. The storage medium of claim 7, wherein the code is further configured to cause the computing device to send the decrypted and descrambled data to a graphics processor.

9. The storage medium of claim 7, wherein code is further configured to cause the computing device to:
receive video data;
decrypt a first portion of the video data using the decryption key;
generate the scrambling key based on the decrypted first portion of the video data; and
descramble a second portion of the video data using the scrambling key.

10. The storage medium of claim 7, wherein the code is further configured to cause the computing device to:
successively receive data frames;
successively decrypt a first portion of each data frame using the decryption key;
successively generate a scrambling key for each respective data frame based on the decrypted first portion of the respective data frame; and
successively decrypt a second portion of each respective data frame using the generated scrambling key for the respective data frame.

* * * * *